United States Patent [19]
Swiatowy et al.

[11] Patent Number: 5,823,255
[45] Date of Patent: Oct. 20, 1998

[54] TUBULAR CASING CUTTER

[75] Inventors: Jeffrey Swiatowy, Cary; Scott Ferrar, Wheeling, both of Ill.

[73] Assignee: The E. H. Wachs Company, Wheeling, Ill.

[21] Appl. No.: 768,321

[22] Filed: Dec. 17, 1996

[51] Int. Cl.⁶ ............................................ E21B 29/00
[52] U.S. Cl. .................... 166/55.1; 166/55.3; 166/55.7
[58] Field of Search .......................... 166/55, 55.1, 55.2, 166/55.3, 55.7

[56] References Cited

U.S. PATENT DOCUMENTS

| | | | |
|---|---|---|---|
| 2,015,277 | 9/1935 | McCullough | 166/55.7 |
| 2,084,306 | 6/1937 | Brannon et al. | 166/55.7 |
| 2,322,694 | 6/1943 | Kinzbach | 166/55.7 |
| 2,351,187 | 6/1944 | Brown et al. | 166/55.7 |

OTHER PUBLICATIONS

The E. H. Wachs Company drawing B SL–12N for Internal Casing Cutter dated Dec. 11, 1989.

*Primary Examiner*—Roger J. Schoeppel
*Attorney, Agent, or Firm*—Patnaude, Videbeck & Marsh

[57] ABSTRACT

A machine for cutting a length of pipe has a body with cross-sectional dimensions which are less than the inner diameter of the pipe to be cut. The machine has a plurality of legs which extend radially from the body such that the machine can be fitted within a length of pipe and locked in position by moving the legs radially outward. The machine further has a rotating tool for cutting the inner wall of the length of pipe.

9 Claims, 8 Drawing Sheets

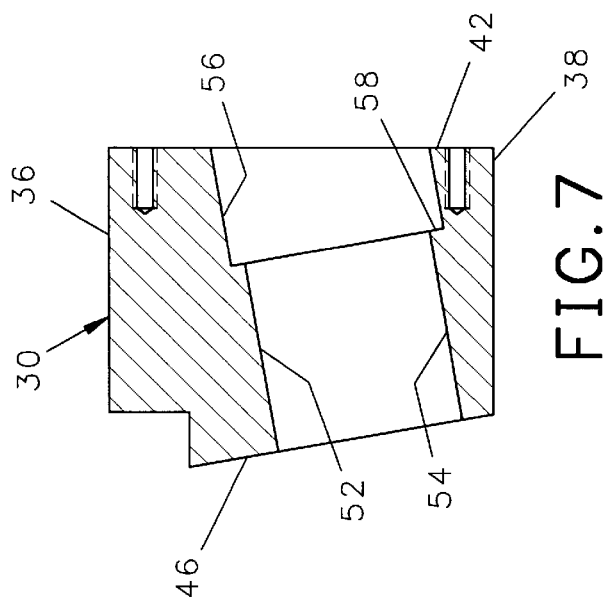
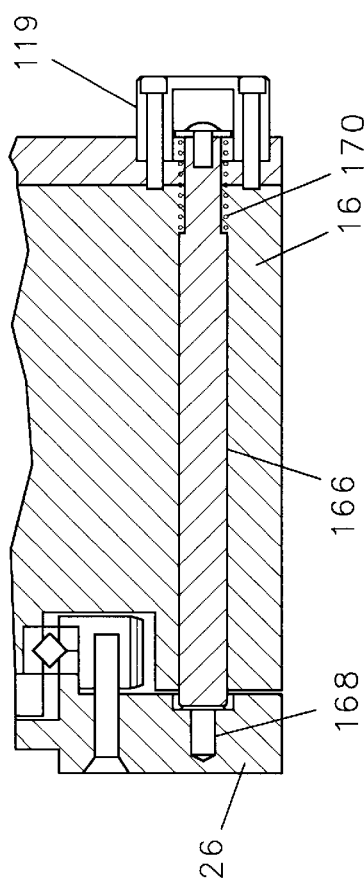
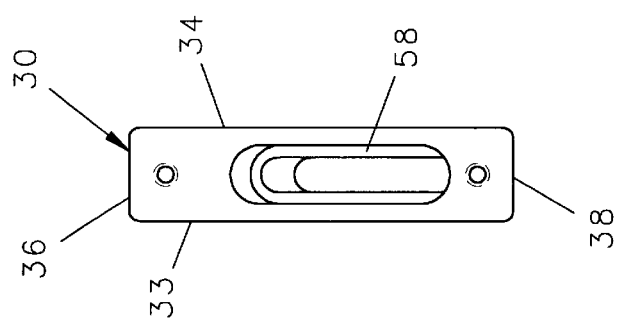

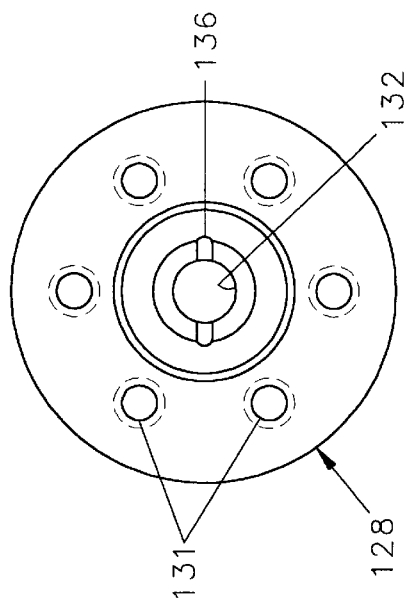
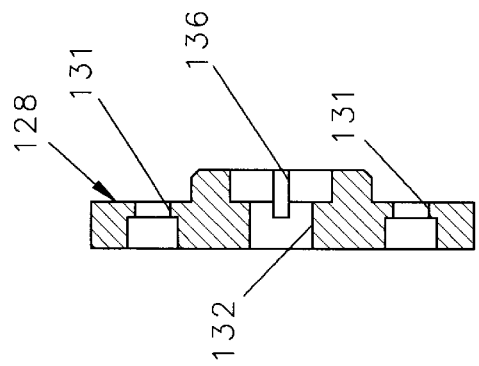
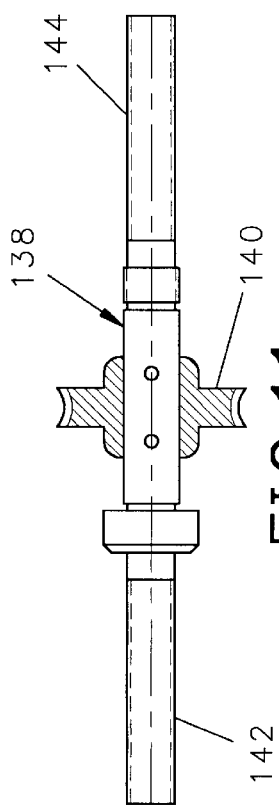
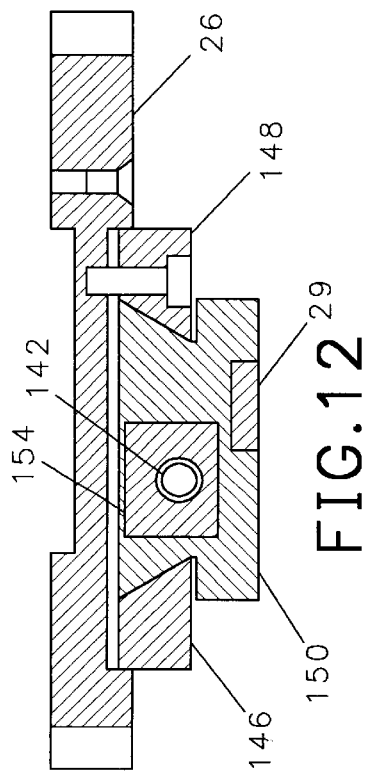
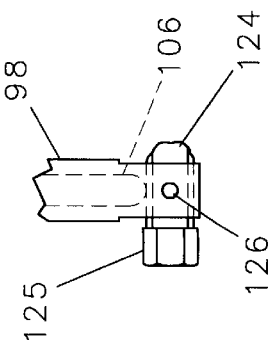

TUBULAR CASING CUTTER

The present invention relates to machines for cutting a tubular piece of pipe, and in particular to a machine for extending within the central opening of a pipe and cutting the pipe from the inside out.

BACKGROUND OF THE INVENTION

For certain industries, it is necessary to weld lengths of pipe in end-to-end relationship, with the final length determined after the pieces have been welded together. For example, in the well drilling industry, a bore is drilled into the ground and a sleeve or pipe fitted into the bore, and after insertion a portion of the sleeve extends vertically out of the hole.

Existing machines used to cut such pipe have a clamp assembly which extends around the outer circumference of the pipe and retains a saw or cutting tool against its outer surface. When such machines are used to cut a length of pipe which, for example, extends vertically from a well head, the pipe cannot be cut such that the end is flush with the surrounding surface material, such as concrete.

It would be desirable, therefore, to provide a cutting machine which can cut transversely through a length of pipe without requiring that the machine be clamped to the outer circumference thereof.

SUMMARY OF THE INVENTION

Briefly, the present invention is embodied in a machine for making a transverse cut in a length of pipe having a given inner diameter and a wall with an inner surface. The machine has a body, the cross-sectional dimensions of which are less than the given inner diameter of the pipe for which the machine is intended to cut. A plurality of radially movable feet secured to the body can be forced against the inner surface of the pipe into which the machine is inserted to retain the machine relative to the pipe. In the preferred embodiment, the machine includes a cam which applies substantially equal forces to each of the feet to thereby retain the machine at a fixed location within the inner opening of the pipe.

The machine further has a cutting tool for cutting the wall of the pipe, and in the preferred embodiment, the cutting tool is in the form of a hardened blade mounted on a radially movable retainer, where the retainer itself rotates around an axis concentric with the axis of the length of pipe. A motorized drive rotates the rotating member, and incrementally advances the cutting tool radially outward on each revolution of the rotating member and thereby causes the tool to cut deeper into the wall of the length of pipe.

GENERAL DESCRIPTION OF THE DRAWINGS

A better understanding of the present invention will be had by referring to the following detailed description taken in conjunction with accompanying drawings wherein:

FIG. 6 is an end view of one of the legs of the machines;

FIG. 7 is a cross-sectional view of the leg shown in FIG. 6;

FIG. 11 is an enlarged side view of the cutter assembly drive shaft;

FIG. 12 is a fragmentary cross-sectional view of the cutter assembly taken through line 12—12 of FIG. 2;

FIG. 13 is an enlarged fragmentary view of the lower end of the shaft shown in FIG. 10 with portions of the interior shown in phantom lines;

FIG. 14 is an enlarged end view of a locking plate for the machine of FIG. 1;

FIG. 15 is a cross-sectional view of the locking plate shown in FIG. 14; and

FIG. 16 is a fragmentary cross-sectional view of the machine taken through line 16—16 of FIG. 1.

DETAILED DESCRIPTION OF A PREFERRED EMBODIMENT

Figure 1:
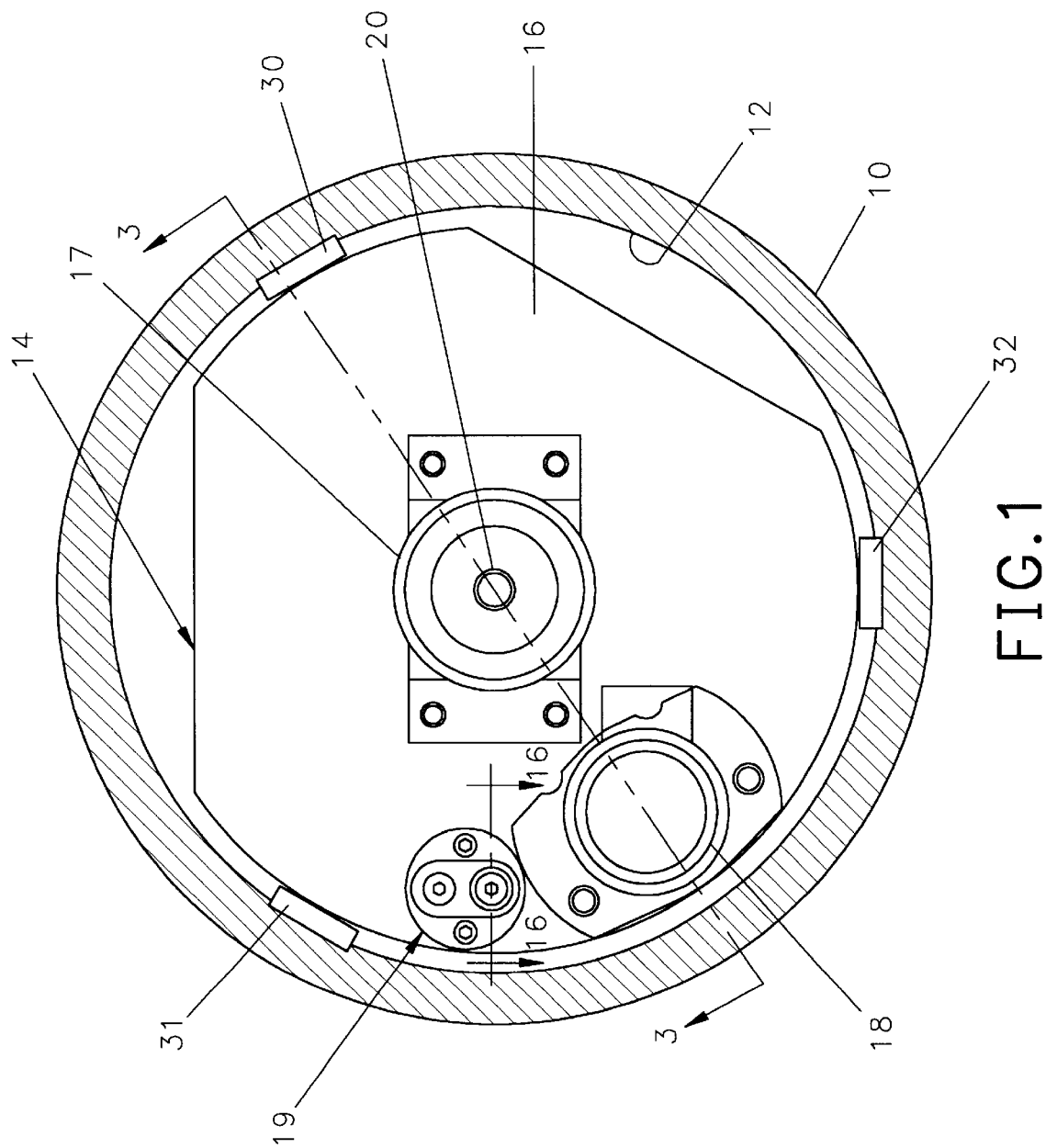
FIG. 1 is a top view of a machine in accordance with the present invention fitted into a length of pipe.
Figure 2:
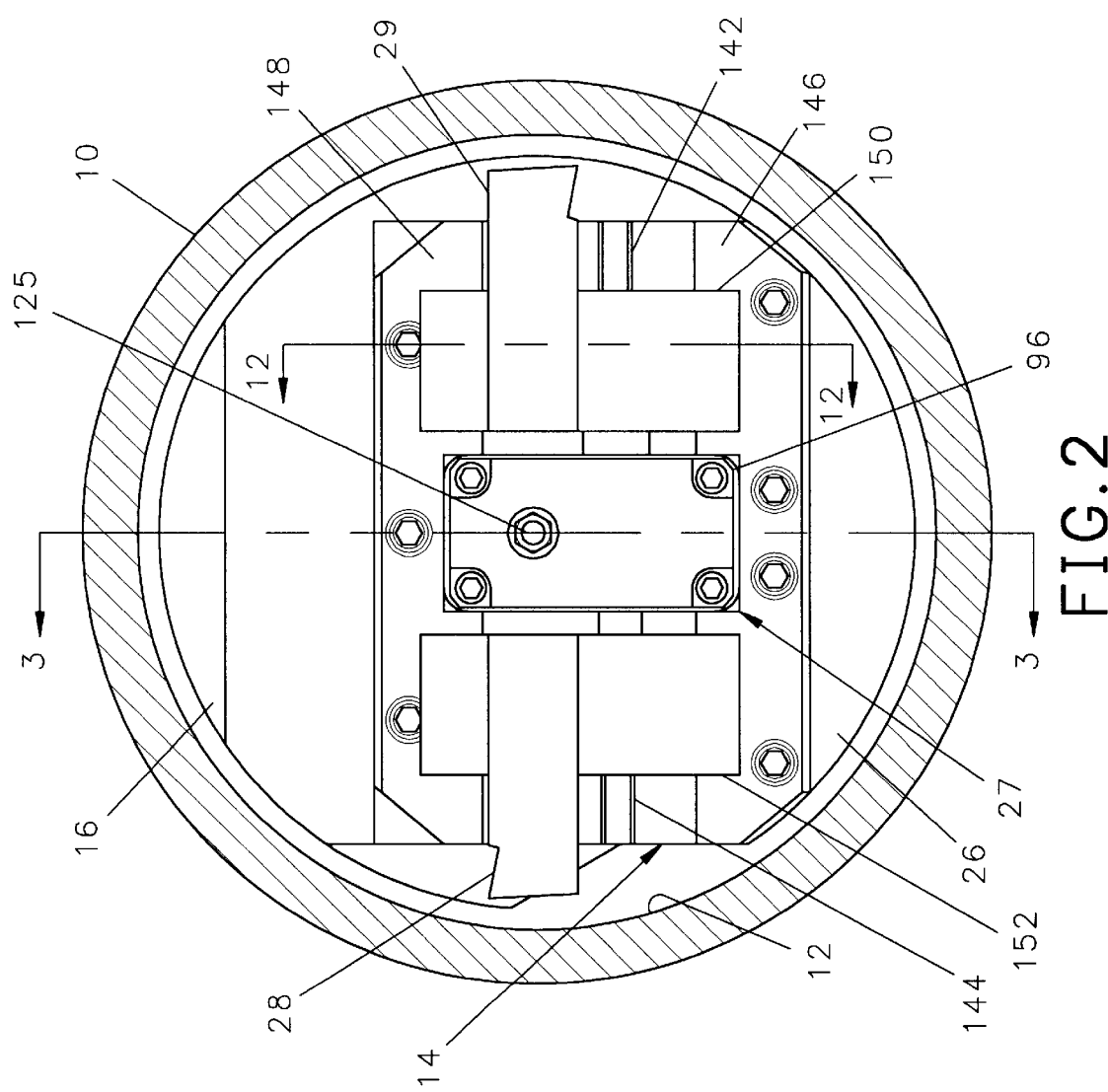
FIG. 2 is a bottom view of the machine shown in FIG. 1.
Figure 3:
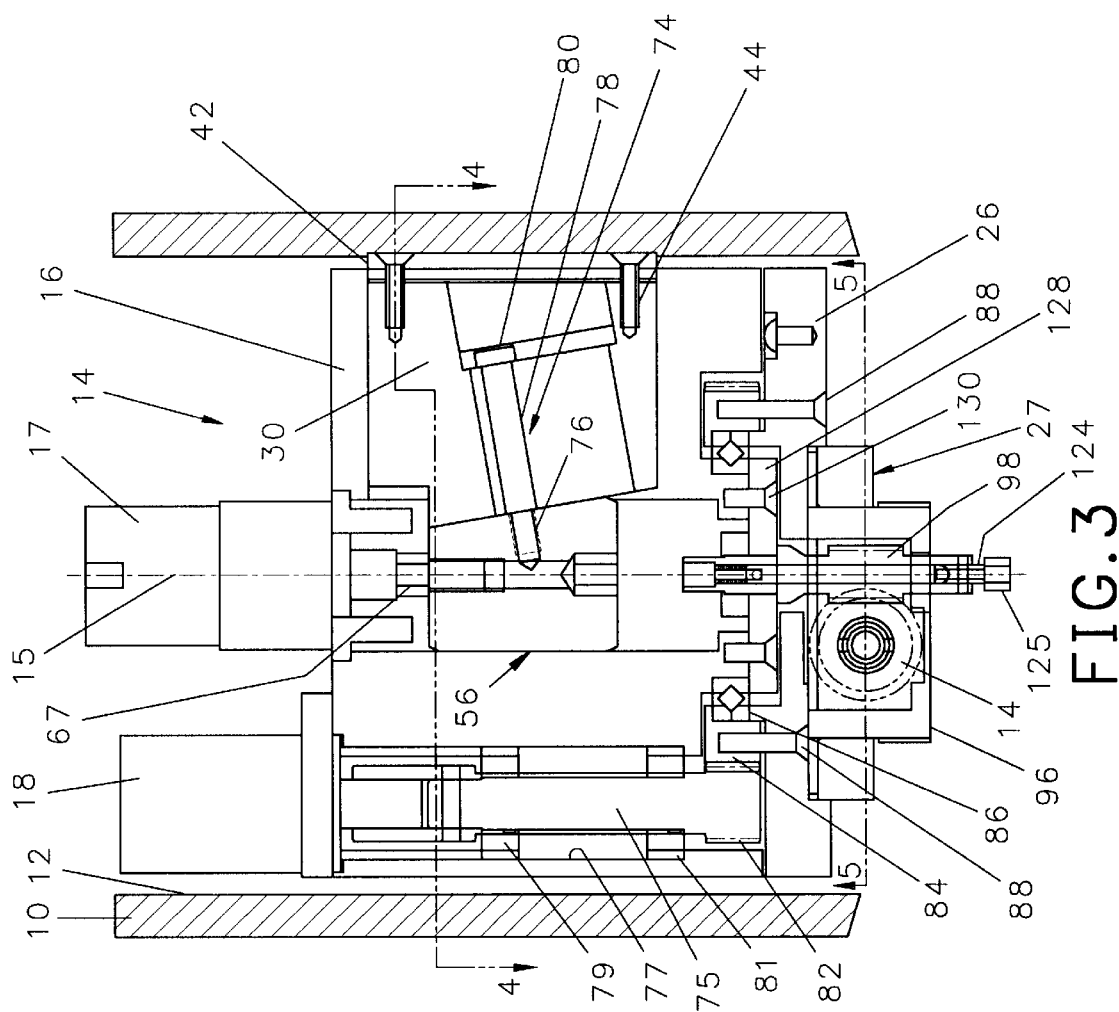
FIG. 3 is a cross-sectional view of the machine shown in FIG. 1 taken through lines 3—3 of FIG. 1 and 3—3 of FIG. 2.
Figure 4:
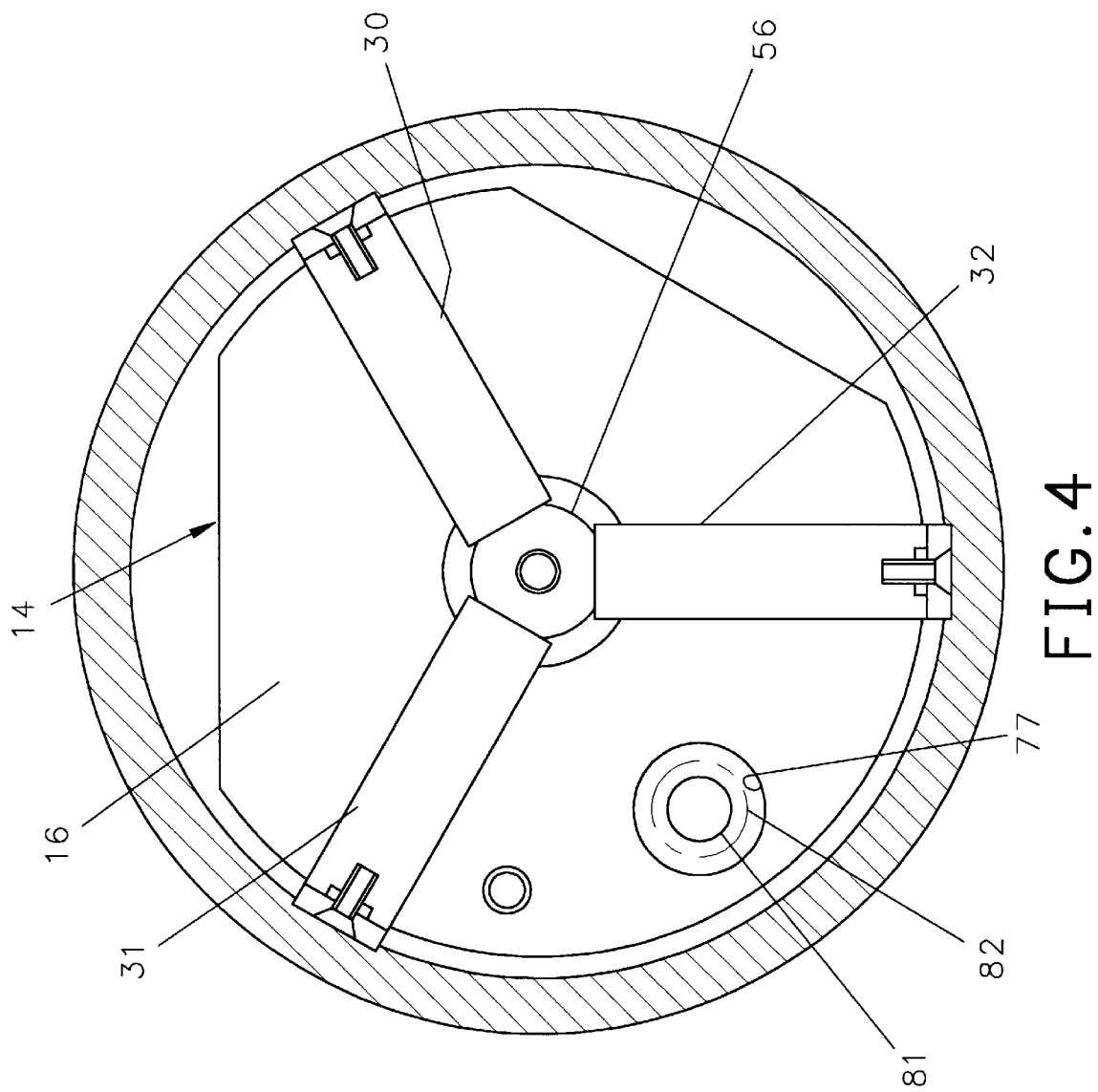
FIG. 4 is a cross-sectional view of the machine in FIG. 1 taken through line 4—4 of FIG. 3.

Referring to FIGS. 1, 2 and 3, a length of pipe 10 has a wall 12 and fitted within the inner opening thereof is a casing cutting machine 14. The machine 14 has transverse outer dimensions which are less than the cross-sectional diameter of the pipe 10 into which it is fitted such that the entire machine 14 can be fitted within the inner opening of the pipe 10.

The machine 14 is depicted in the drawings as positioned within a length of pipe 10 which is vertically oriented, and for the purposes of this description the parts will be described with respect to the orientation shown in FIG. 3. The machine has a longitudinal axis 15 and when the machine 14 is positioned within a length of pipe 10, the axis 15 of the machine will be concurrent with the longitudinal axis of the length of pipe 10. Portions of the machine will, therefore, be described as being positioned radially with respect to the longitudinal axis 15.

The machine has a housing 16 having a semicylindrical outer surface sized to fit within the length of pipe 10. Positioned on the upper surface of the housing 16 are an axially oriented hydraulic cylinder 17, a vertically oriented hydraulic motor 18, and a counter 19, for counting the number of rotations made by the outer assembly, as described below. An axially located threaded hole 20 in the upper end of the hydraulic cylinder 17 is adapted to receive an eye bolt or the like such that the machine 14 may be lowered into the end of a length of pipe 10 with a crane or the like having a hook through the eye bolt, not shown, in the hole 20.

At the lower end of the housing 16 is a rotating member 26 which turns about the axis 15 of the machine and is driven by the motor 18 as described below. Mounted on the rotating member 26 is a feed screw assembly 27 which moves two cutter blades 28, 29 radially outward as the rotating member 26 turns.

Referring to FIGS. 3, 4, 6, and 7, extending radially outward of the housing 16 are a plurality of identical legs 30, 31, 32, of which leg 30 is exemplary of all three. Each leg 30 is generally rectangular in shape and has substantially planar opposing sides 33, 34 and planar upper and lower surfaces 36, 38, respectively. The outer surface 40 is also substantially planar, and fitted against the outer surface 40 is a removable shoe 42 retained by a plurality of bolts 44 which extend through the shoe 42 and into threaded holes in the body of the leg 30. The inner surface 46 of each leg is angular to form a ramp, and at the upper end of the inner surface 46 is a notch 48.

Extending through the body of each leg 30, from the inner surface 46 to the outer surface 40 is a longitudinal slot 50. The end surfaces 52, 54 thereof are perpendicular to the inner surface 46. The slot 50 further has a countersink 56 extending from the outer surface 40, and as best shown in FIG. 6, the countersink 56 forms a shoulder 58 which extends around the entire inner surface of the slot 50 and parallel to the inner surface 46.

Figure 8:
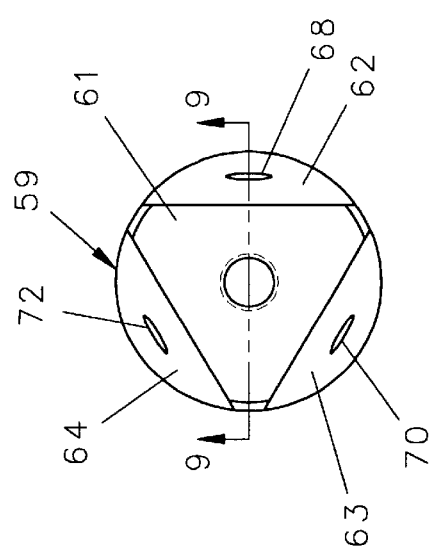
FIG. 8 is an upper end view of a cam from the machine in FIG. 1.
Figure 9:
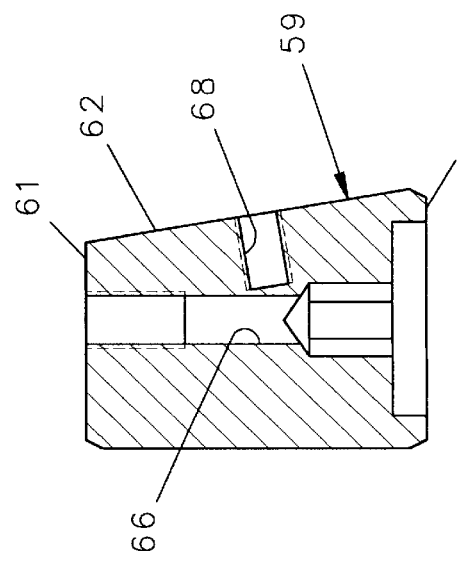
FIG. 9 is a cross-sectional view of the cam shown in FIG. 8.

Referring to FIGS. 3, 8 and 9, a cam 59 is formed from a cylindrical stock having planar opposing ends 60, 61 and has three planar ramp faces 62, 63, 64 thereon oriented 120 degrees from one another with the faces 62, 63, 64 converging toward the upper end 61 giving it a nearly triangular shape. As shown in FIG. 1, each of the planar faces 62, 63, 64 has an angle of incline which is equal to the angle of the ramped inner surface 46 of the legs 30. Extending axially through the length of the cam 59 is a longitudinal bore 66 the upper end 61 of which is threaded for receiving the threaded distal end of a shaft 67 which extends from the cylinder 18. Extending perpendicular into each of the ramp surfaces 62, 63, 64, are threaded bores 68, 70, 72, and the ramp surface 46 of each leg 30 is retained against one of the surfaces 62, 63, 64 of the cam 59 by bolts 74 threadedly received in the threaded bores 68, 70, 72 of the cam 67. The central shank 78 of each bolt 74 extends through one of the elongated slots 50 of the associated leg, and the head 80 thereof has outer dimensions which are larger than the width of the slot 50 and smaller than the counterbore 56, such that the cam 67 is axially slidable along the ramp surface 46 of each leg 30.

When the shaft 24 is retracted within the cylinder 18, as shown in FIG. 1, each of the ramp surfaces 62, 63, 64 of the cam 67 will be moved against the upper end of the ramp surfaces 46 of all the legs 30, 31, 32, and the legs and shoes 42 will be forced radially outward against the inner surface of the wall 12 of the pipe 10, to thereby lock the machine 14 against movement within the pipe 10. Conversely, when the shaft 24 is extended from the cylinder 18, the ramp surfaces 62, 63, 64 of the cam 59 will be moved against the lower end of the ramp surfaces 46 of the legs 30, 31, 32, and the bolts 72 will slide to the lower end of the slots 50. Extending the shaft 67 will, therefore, draw the legs 30, 31, 32 inward, thereby releasing the radial pressure of the shoes 42 against the inner surfaces of the wall 12 of the pipe 10, such that the machine 14 can be withdrawn from one end thereof.

Referring to FIG. 3, the motor 18 rotates a shaft 75 which extends through a longitudinal hole 77 in the housing 16. The shaft 75 is journalled for rotation in a pair of bearings 79, 81, and at the lower end of the shaft 75 is a pinion gear 82 which drives a ring gear 84 mounted on bearings 86 for rotation within the housing 16. The rotating member 26 is secured to the ring gear 84 by a plurality of bolts 88 extending through countersunk holes 90 in the rotating member 26 and into aligned threaded holes in the ring gear 84. The rotating member 26 is, therefore, driven by the motor 18 through the shaft 81 and the gears 82, 84.

Referring to FIGS. 2, 3, 9, and 10, below the rotating member 26 the feed screw assembly 77 is enclosed in an enclosure 96. Extending axially through the rotating member 26 and the enclosure 96 is a hollow shaft 98 the outer surface of which includes a centrally located worm gear 100. Positioned above the worm gear 100 is a radial flange 102 with a planar upper surface 103. The upper end of the central bore of the hollow shaft 98 has threadings 104, and extending through the bore is a longitudinal plunger 106 which is retained within the upper end of the shaft 98 by a threaded plug 108 received in the threadings 104. The plunger 106 is urged downwardly within the shaft 98 by a coil spring 110 which is compressed between the lower surface of the plug 108 and the upper end of the plunger 106. Extending through a transverse cylindrical hole 112 in the plunger 106 and through diametrically opposing longitudinal slots, 113, 114, in the shaft 98 is a locking pin 116.

At the lower end of the shaft 98 is a longitudinal slot 118, and an elongate cam 124 having a handle 125 is retained in the slot 118 by a pin 126 extending through holes in the two sides portions of the shaft 98. The cam 124 is movable from a longitudinal position, shown in FIG. 3, to a transverse position shown in FIG. 13. When the cam is in the longitudinal position, the distal end thereof depresses the plunger 106 against the spring 110 and moves the locking pin 116 upward within the slots 113, 114. When the cam 124 is in the transverse position shown in FIG. 13, the distal end thereof no longer depressing the plunger 106, and the spring 110 will urge the plunger downward and the pin 116 will move to the lower end of the slots 113, 114.

As best shown in FIGS. 3 and 14, a locking plate 128 is retained by a plurality of bolts 130 through holes and into the lower surface of the stationary housing 16 of the machine. The upper end of the shaft 98 extends through a countersunk axial hole 132 in the locking plate 128. A slot 136 in the upper surface of the locking plate 128 is sized to receive the ends of the locking pin 116 when the cam 124 is in the transverse position shown in FIG. 13. Accordingly, when the cam 124 is in the transverse position, the coil spring 110 will urge the plunger 106 and the locking pin 116 therein in the downward direction where it will engage the slot 136 in the locking plate 128, and the shaft 98 will be locked against rotation with respect to the housing 98. Conversely, movement of the cam to the longitudinal position will move the plunger 106 and the locking pin 116 upwardly and free of the slot 136, thereby releasing the shaft 98 to rotate with the rotating member 26.

Figure 5:
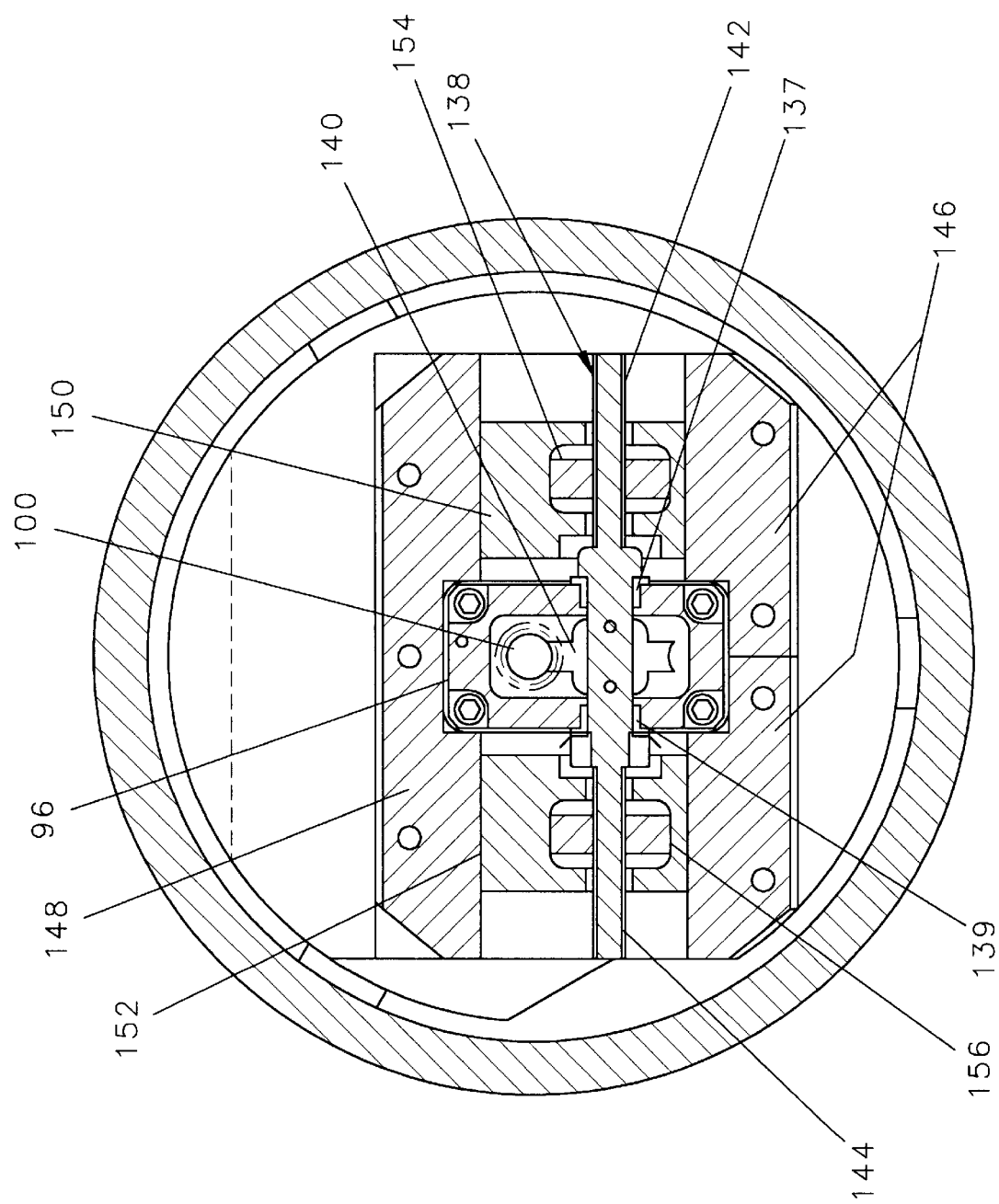
FIG. 5 is a cross-sectional view of the machine of FIG. 1 taken through line 5—5 of FIG. 3.
Figure 10:
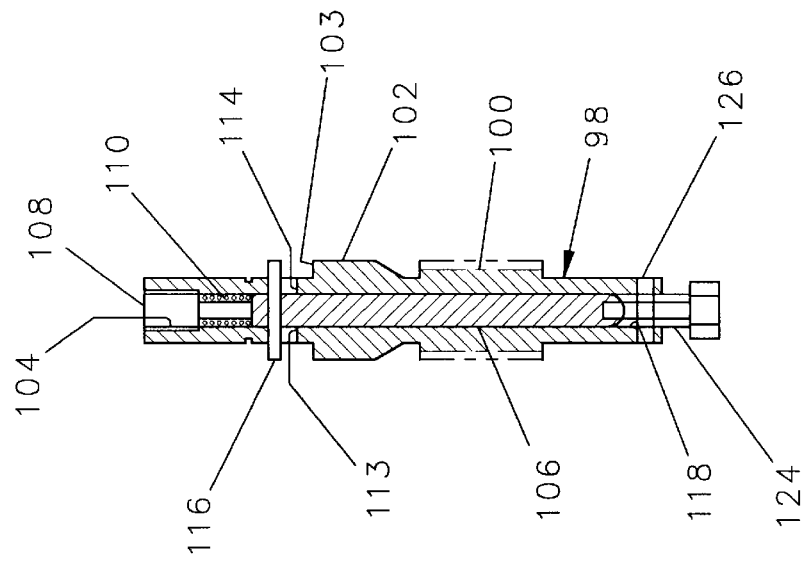
FIG. 10 is an enlarged side view of the worm gear and shaft for the machine of FIG. 1.

As shown in FIGS. 5 and 11, oriented perpendicular to the shaft 98 and journaled in bearing 137, 139 in enclosure 96 is a drive shaft 138 having a centrally located gear 140 thereon which engages the worm gear 100. The first and second ends 142, 144, respectively, are threaded in opposite directions.

Referring to FIGS. 2, 5 and 12, positioned in the lower surface of the rotating member 26 are first and second guides 146, 148 which retain first and second slidable retainers 150, 152, therein, one retainer positioned on each side of the enclosure 96 such that each retainer 150, 152 is radially slidable between the guides 146, 148.

Each of the retainers 150, 152 has holes aligned therein to receive one of the ends 142, 144, respectively, of the drive shaft 138, and centrally located in each of the retainers 150, 152 is a nut 154, 156 having inner threadings complementary to the threadings of the ends of the drive shaft extending therethrough. The nuts 154, 156 are sized to be non-rotatable within their respective retainers 150, 152, such that rotation of the drive shaft 138 will advance the nuts 154, 156, and the retainers 150, 152, in which they are retained, for simultaneous movement radially outwardly or inwardly. Each of the retainers 150, 152 retains one of the cutting tools 28, 29 at the distal ends thereof.

When the cam 124 is moved to the transverse position such that the locking pin 116 engages the slot 136 of the locking plate, the shaft 98 will be locked against rotation with the rotating member 26. When the motor 18 and gears 82, and 84 rotate the rotating member 26 around the stationary shaft 98, the worm gear 100 will cause rotation of the drive shaft 138, and thereby cause the cutting tools 158, 160 to be advanced radially outward for cutting into the side 12 of a length of pipe 10. Once the cut is completed, the direction of the motor 18 can be reversed and the tools 28, 29 withdrawn prior to releasing the machine 14 from within a length of pipe 10.

Referring to FIGS. 1 and 16, the number of rotation made by the rotating member 26 in either direction is recorded by the counter 19. The counter 19 is actuated by a plunger 16 which extends through to a longitudinal hole in the housing 16. The lower end of the plunger 166 rides against the upper surface of the rotating member 26. A screw 168 is positioned on the upper surface of the rotating member 26 such that the head of the screw will pass under the distal end of the plunger once each rotation of the rotating member 26. The plunger 166 is biased by a coil spring 170 for downward motion such that the lower end of the plunger 166 will ride along the upper surface of the rotating member 26, or the head of the screw 168. Whenever the head of the screw 168 passes under the plunger 166, the plunger will be moved upward, and the counter 19 will record upward jump of the plunger 166. The record is kept by the counter 19 with the recorded number being equal to the number of rotations of the rotating member 26.

Before inserting the machine into a length of pipe, the shaft 67 should be fully extended from the cylinder 18 thereby withdrawing the legs 30, 31, 32, such that the machine 14 may readily fit within the inner opening of the pipe. The motor 17 should be operated in the reverse direction for a sufficient number of rotations of the rotating member 26 to withdraw the retainers 150, 152 and cutting tools 28, 29 mounted thereon, radially inwardly such that the tools 28, 29 will not encounter the inner wall of the pipe while the machine is being inserted. The cam 124 should be in the transverse orientation so that the shaft 98 is locked against rotation with the rotating member 98.

When the machine is properly positioned within the length of pipe, hydraulic fluid is directed into the cylinder 22 to withdraw the shaft 24 and thereby extend the legs 30, 31, 32. When the legs are fully extended, the machine will be locked within the length of pipe. Thereafter, the motor 17 can be operated in the forward direction causing the rotatable member 26 to rotate around the shaft 98. Rotating the rotatable member around the shaft 98 will thereafter cause the retainers 150, 152 and the cutting tools 28, 29 mounted thereon to be moved radially outward to cut the inner surface of the pipe. The machine will continue to operate until the cutting tools 28, 29 have cut through the wall 12 of the length of pipe. Thereafter, the motor 17 can be reversed to thereby withdraw the retainers 150, 152 and the cutting tools 28, 29 thereon radially inward. Finally, the direction of hydraulic fluid to the cylinder 18 can be reversed, causing the shaft 67 to be extended, and the legs 30, 31, 32 to be withdrawn, after which the machine 14 can be removed from the length of pipe.

While the present invention has been described in connection with one embodiment, it will be understood that many changes and modifications may be made without departing from the true spirit and scope of the invention, and it is intended by the appended claims to cover all such changes and modifications which come within the true spirit and scope of the invention.

What is claimed:

1. A machine for making a transverse cut in a length of pipe having a given inner diameter, an outer wall, and an inner surface, said machine comprising:

a body having a longitudinal axis and having cross sectional dimensions all of which are less than said given diameter, a plurality of legs, on said body, said legs having distal ends which are radially movable against said inner surface of said length of pipe, means for moving said distal ends of said legs radially against said inner wall of said pipe, a rotating member on said body, said rotating member rotatable about said longitudinal axis, cutting means on said rotating member for cutting said outer wall of said length of pipe, and motor means on said body and connected to said rotating member for rotating said rotating member, said motor means insertable within said length of pipe with said body when making a transverse cut.

2. The machine of claim 1 and further comprises, a first gear fixed against rotation with respect to said body, a shaft on said rotatable member, said shaft having a threaded portion, a second gear fixedly mounted on said shaft, said first gear in engagement with said second gear, means for advancing said cutter member linearly outward on said rotating member, and said means for advancing in engagement with said threaded portion.

3. The machine of claim 1 wherein said cutting means comprises, means for linearly advancing said cutting member radially outward on said rotating member with respect to an axis of rotation of said cutting member.

4. The machine of claim 3 wherein said means for advancing comprises, a first gear fixed against rotation with respect to said body, a second gear mounted on said rotating member and in engagement with said first gear.

5. A machine for making a cut in a length of pipe having a given inner diameter, an outer wall, and an inner surface, said machine comprising:

a body having a longitudinal axis and having cross sectional dimensions all of which are less than said given inner diameter, a plurality of legs, on said body, said legs having distal ends which are radially movable against said inner surface of said length of pipe, each of said plurality of legs having a ramp surface, cam means for engaging said ramp surfaces of said legs, a rotating member rotatable with respect to said body about said axis, a cutting member on said rotating member, said cutting member mounted for linear movement on said rotating member, a first gear fixed against rotation with respect to said body, a second gear mounted on said rotating member and in engagement with said first gear, and means connected to said second gear for advancing said cutting member radially outward of said axis.

6. The machine of claim 5 wherein said cam is axially movable in said body.

7. The machine of claim 5 wherein said first gear has an axis which is coaxial with said axis of said rotating member.

8. The machine of claim 5 wherein one of said first gear and said second gear is a worm gear.

9. The machine of claim 5 wherein, said first gear has an axis which is coaxial with said axis of said rotating member, said second gear is fixedly mounted on a shaft, said shaft having threads on a portion thereof, and said means connected to said second gear for advancing said cutting member comprises a threaded female member in engagement with said threaded portion of said shaft.

* * * * *